April 8, 1924. 1,490,071
H. J. MURPHY
GREASE GUN FILLING APPARATUS
Filed March 14, 1922
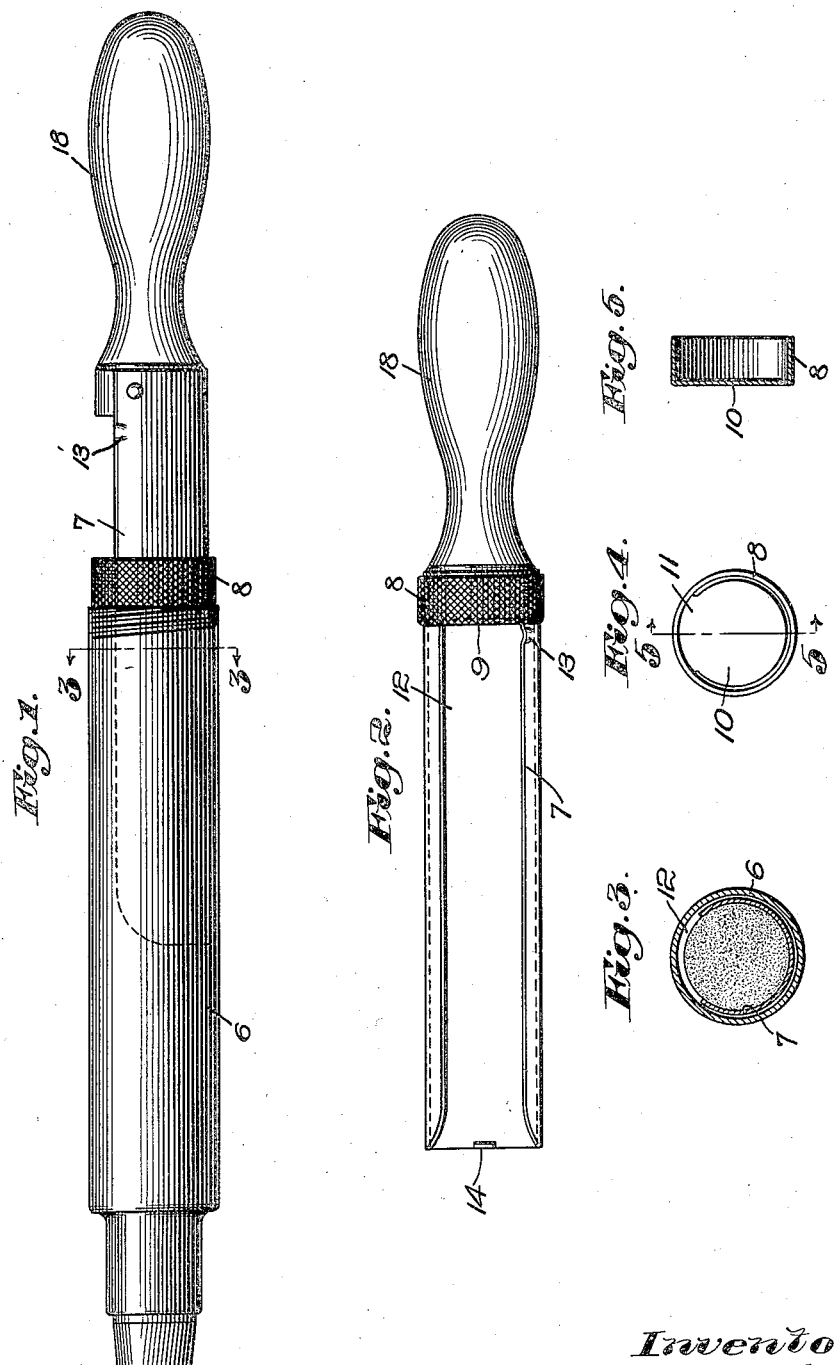
Inventor:
Howard J. Murphy.
By Emery Booth Janney & Varney
Attys.

Patented Apr. 8, 1924.

1,490,071

UNITED STATES PATENT OFFICE.

HOWARD J. MURPHY, OF READING, MASSACHUSETTS, ASSIGNOR TO CARR FASTENER COMPANY, OF CAMBRIDGE, MASSACHUSETTS, A CORPORATION OF MAINE.

GREASE-GUN-FILLING APPARATUS.

Application filed March 14, 1922. Serial No. 543,655.

*To all whom it may concern:*

Be it known that I, HOWARD J. MURPHY, a citizen of the United States, and resident of Reading, in the county of Middlesex, State of Massachusetts, have invented an Improvement in Grease-Gun-Filling Apparatus, of which the following description, in connection with the accompanying drawings, is a specification, like characters on the drawings representing like parts.

This invention pertains to improvements in grease gun filling apparatus.

It is among the objects of the invention to provide a simple, inexpensive, readily manipulated and relatively cleanly device for filling the barrels of grease guns.

In the drawings, which show the preferred form of my invention selected for illustrative purposes:—

Figure 1 is a side elevation of a grease gun filling device and a grease gun barrel being filled thereby;

Fig. 2 is a front elevation of the grease gun filling device illustrated in Fig. 1;

Fig. 3 is a section on the line 3—3 of Fig. 1;

Fig. 4 is an end elevation of the piston portion which is used to hold the grease in the grease gun barrel during the retraction of the remainder of the grease gun filling device from the barrel; and Fig. 5 is a section on the line 5—5 of Fig. 4.

Referring to the drawings and to the preferred form of my invention selected for illustrative purposes, I have shown a grease gun barrel 6 with one end, herein shown as the back end, removed to permit filling of the barrel with grease.

Cooperating with the barrel, I have shown grease gun filling apparatus, which, in the preferred form of my invention illustrated, includes a scoop or shell 7, a handle 18 at the rear end thereof and a cooperating piston presenting a ringlike handle part 8 exterior to the scoop or shell 7 and carrying, preferably at its forward end 9, a piston part 10 filling the interior of the shell or scoop 7 and connected to the handle 8 by a neck 11 passing through an opening 12 in the scoop or shell 7.

The piston part 10 is preferably formed integral with its ringlike handle 8, and the piston part and handle considered collectively preferably present a cup-shaped part, the piston corresponding to the bottom of the cup and the handle corresponding to preferably cylindrical side walls of the cup to present interiorly of the handle a relatively long guiding surface to hold the piston generally at right angles to the axis of the scoop, while permitting guided movement of the piston in the scoop or shell 7. The scoop or shell 7 is preferably generally cylindrical and proportioned readily to enter the grease gun barrel. The handle portion 8 is preferably too large to enter the grease gun barrel, but adapted to abut against the end of the barrel with the piston 10 substantially flush with the end of the barrel, as will be understood from Figures 1 and 5.

I preferably provide retaining means for holding the piston at the back end of the scoop or shell 7 when desired, such retaining means taking the form of a slight irregularity in the shell 7 as typified by the outwardly sprung boss 13. The boss 13 is so proportioned as to hold the piston 10 and ring 8 against the force of gravity but to permit ready passage of these parts over it when desired.

Similarly at the front or lower end of the scoop or shell, I preferably provide a second retaining means typified by the boss 14 to prevent the piston and handle from being entirely withdrawn from the scoop or shell 7, while permitting the piston to reach substantially the end of such scoop or shell.

In using the filling apparatus, the piston is retracted to the position shown in Fig. 2. The scoop or shell is then filled, preferably by plunging it in a can of grease and turning the shell somewhat axially to cut off a cylindrical charge of grease within the shell, pursuant to which the device with the charge of grease may be readily withdrawn from the can. The scoop may then be entered in the grease gun barrel until the handle 8 abuts against the end of the barrel. The handle 8, which is preferably knurled or otherwise exteriorly roughened, may then be grasped by the fingers of the hand which holds the grease gun barrel and so held with the piston 10 substantially flush with the end of the barrel until the scoop is withdrawn by the other hand of the operator grasping the handle 8. During this withdrawal of the scoop, illustrated as partly effected in Fig. 1, the grease will be forced from the scoop or shell 7 and left in the grease gun barrel.

When retraction of the scoop is completed, the filling apparatus may if desired be moved laterally, the piston 10 sliding across the open end of the grease gun barrel and leaving the grease at the end of the barrel nicely smoothed.

While I have shown and described a preferred form of one embodiment of my invention, it will be understood that my invention is best defined by the following claims.

Claims:

1. A grease gun filler comprising, in combination, a shell adapted to fit within a grease gun barrel, said shell presenting a longitudinal opening and an expelling member presenting a plunger part within the shell for holding grease in the grease gun barrel during retraction of the shell, said expelling part presenting a handle portion surrounding said shell and connected to said plunger part through said longitudinal opening in said shell.

2. A grease gun filler comprising, in combination, a shell adapted to fit within a grease gun barrel, said shell presenting a longitudinal opening and an expelling member presenting a plunger part within the shell for holding grease in the grease gun barrel during retraction of the shell, said expelling part presenting a handle portion surrounding said shell and connected to said plunger part through said longitudinal opening in said shell and lying at one side of the plane of said plunger part.

3. A grease gun filler comprising, in combination, a shell adapted to fit within a grease gun barrel, said shell presenting a longitudinal opening and an expelling member presenting a plunger part within the shell for holding grease in the grease gun barrel during retraction of the shell, said expelling part presenting a handle portion surrounding said shell and connected to said plunger part through said longitudinal opening in said shell, said expelling member as a whole cup-formed with a slot through which said shell may slide.

4. A grease gun filler comprising, in combination, a shell adapted to fit within a grease gun barrel, said shell presenting a longitudinal opening and an expelling member presenting a plunger part within the shell for holding grease in the grease gun barrel during retraction of the shell, said expelling part presenting a handle portion surrounding said shell and connected to said plunger part through said longitudinal opening in said shell, said expelling member as a whole cup-formed with a slot through which said shell may slide and the handle portion, forming the side wall of said cup, engaging in guided relation the external surface of said shell.

5. A grease gun filler comprising, in combination, a scoop including a shell, having an opening extending lengthwise thereof, a handle at one end of the shell and a ring slidable exteriorly of said shell and carrying a plunger slidably fitting within said shell, said plunger relatively thin and said ring extended longitudinally of said shell and presenting an interior guiding surface to the exterior of said shell.

6. A grease gun filler comprising, in combination, a scoop including a shell, having an opening extending lengthwise thereof, a handle at one end and a ring slidable exteriorly of said shell and carrying a plunger within said shell, said plunger relatively thin and said ring extended longitudinally of said shell and presenting an interior guiding surface to the exterior of said shell, and means on said shell frictionally holding said plunger at the end of said shell toward said handle.

7. A grease gun filler comprising, in combination, a scoop including a shell, having an opening extending lengthwise thereof, a handle at one end and a ring slidable exteriorly of said shell and carrying a plunger within said shell, said plunger relatively thin and said ring extended longitudinally of said shell and presenting an interior guiding surface to the exterior of said shell and means on said shell for stopping said ring from being entirely withdrawn from said shell.

8. A grease gun filler comprising, in combination, a shell adapted to pass into a grease gun barrel, a plunger slidably mounted in said shell, and a ringlike handle connected to said plunger, slidable therewith and presenting a relatively extended exterior surface abutting the end of the grease gun barrel when said shell is entered therein whereby when said shell is filled with grease, with the plunger at the rear end thereof, the shell may be then entered in the barrel and said ringlike handle grasped by the hand holding the barrel and the shell then retracted by the other hand of the operator leaving in the barrel the grease theretofore contained in the shell.

9. A plunger for grease gun fillers presenting a part shaped generally like a cup with an upstanding rim and a bottom, the bottom partially removed adjacent said rim to permit passage of a filler shell therethrough.

10. A grease gun filler comprising, in combination, a longitudinally slotted shell of less outside diameter than the inside diameter of the barrel of the grease gun to be filled thereby, and a plunger slidable lengthwise of said shell and connected to a handle portion through the slot in said shell said handle presenting a substantially ringlike portion exterior to said shell and proportioned to bear against the end of the grease gun barrel when said shell is entered therein.

In testimony whereof, I have signed my name to this specification.

HOWARD J. MURPHY.